(12) United States Patent
Kaburlasos et al.

(10) Patent No.: US 10,242,418 B2
(45) Date of Patent: Mar. 26, 2019

(54) RECONFIGURABLE GRAPHICS PROCESSOR FOR PERFORMANCE IMPROVEMENT

(75) Inventors: Nikos Kaburlasos, Lincoln, CA (US); Eric C. Samson, Folsom, CA (US)

(73) Assignee: Intel Corporation, Santa Clara, CA (US)

( * ) Notice: Subject to any disclaimer, the term of this patent is extended or adjusted under 35 U.S.C. 154(b) by 222 days.

(21) Appl. No.: 13/993,696

(22) PCT Filed: Nov. 21, 2011

(86) PCT No.: PCT/US2011/061738
§ 371 (c)(1),
(2), (4) Date: Jun. 13, 2013

(87) PCT Pub. No.: WO2013/077848
PCT Pub. Date: May 30, 2013

(65) Prior Publication Data
US 2013/0286026 A1    Oct. 31, 2013

(51) Int. Cl.
*G06T 1/20*      (2006.01)
*G09G 5/36*      (2006.01)
*G06F 1/32*      (2006.01)
*G06F 1/26*      (2006.01)
*G06F 1/3203*    (2019.01)
*G06F 1/324*     (2019.01)
*G06F 1/3234*    (2019.01)
*G06F 1/3287*    (2019.01)

(52) U.S. Cl.
CPC .............. *G06T 1/20* (2013.01); *G06F 1/26* (2013.01); *G06F 1/3203* (2013.01); *G06F 1/324* (2013.01); *G06F 1/325* (2013.01); *G06F 1/3287* (2013.01); *G09G 5/36* (2013.01); *G09G 2360/08* (2013.01); *Y02D 10/126* (2018.01); *Y02D 10/171* (2018.01); *Y02D 50/20* (2018.01)

(58) Field of Classification Search
CPC .......... G06F 1/3203; G06F 1/26; G06F 1/324; G06F 1/325; Y02B 60/1217
See application file for complete search history.

(56) References Cited

U.S. PATENT DOCUMENTS

| | | | |
|---|---|---|---|
| 7,664,255 B2 | 2/2010 | Amron | |
| 7,802,118 B1 | 9/2010 | Abdalla | |
| 8,316,255 B2 | 11/2012 | Khodorkovsky | |
| 8,542,054 B2 * | 9/2013 | Takayanagi | H03K 19/0016 307/130 |
| 9,035,956 B1 | 5/2015 | Schreyer | |

(Continued)

FOREIGN PATENT DOCUMENTS

| | | |
|---|---|---|
| CN | 200959110 | 10/2007 |
| CN | 101536080 | 9/2009 |

(Continued)

OTHER PUBLICATIONS

PCT International Search Report and Written Opinion issued in corresponding PCT/US2011/061738 dated Jul. 31, 2012 (10 pages).

(Continued)

*Primary Examiner* — Jaweed A Abbaszadeh
*Assistant Examiner* — Gayathri Sampath
(74) *Attorney, Agent, or Firm* — Trop Pruner & Hu, P.C.

(57) ABSTRACT

Power gating a portion of a graphics processor may be used to improve performance or to achieve a power budget. A processor granularity, such as a slice or subslice, may be gated.

27 Claims, 4 Drawing Sheets

(56) References Cited

U.S. PATENT DOCUMENTS

| | | | |
|---|---|---|---|
| 2005/0120254 A1* | 6/2005 | Suzuoki | G06F 1/206 713/320 |
| 2009/0001814 A1* | 1/2009 | Subramaniam | 307/39 |
| 2009/0204835 A1 | 8/2009 | Smith | |
| 2010/0131786 A1 | 5/2010 | Cai | |
| 2010/0174933 A1 | 7/2010 | Lu | |
| 2010/0295852 A1* | 11/2010 | Yang | G06F 1/3203 345/426 |
| 2011/0060928 A1* | 3/2011 | Khodorkovsky et al. | 713/323 |
| 2011/0115567 A1 | 5/2011 | Sutardja | |
| 2011/0213950 A1 | 9/2011 | Mathieson | |
| 2011/0239016 A1* | 9/2011 | Boyd et al. | 713/320 |
| 2011/0291746 A1* | 12/2011 | Ibrahim et al. | 327/538 |
| 2012/0013627 A1* | 1/2012 | Shah | G06F 1/3203 345/522 |
| 2012/0102344 A1* | 4/2012 | Kocev et al. | 713/322 |
| 2012/0119816 A1* | 5/2012 | Rogers | G06F 1/3287 327/434 |
| 2012/0159496 A1* | 6/2012 | Dighe | G06F 9/4893 718/102 |
| 2012/0185703 A1* | 7/2012 | Machnicki | G06F 1/3203 713/300 |
| 2013/0015904 A1* | 1/2013 | Priel et al. | 327/419 |

FOREIGN PATENT DOCUMENTS

| | | |
|---|---|---|
| CN | 101604199 | 12/2009 |
| CN | 101802751 | 8/2010 |
| TW | 201042573 | 12/2010 |

OTHER PUBLICATIONS

Yo, L., et al., "Dynamic Power Gating Implementation", Apr. 2011; http://www.intel.com/content/dam/www/public/us/en/documents/white-papers/emgd-dynamic-power-gating-paper.pdf, (14 pages).

Li, Ching Yeo, et al., "Dynamic Power Gating Implementation," Apr. 2011 (from Internet—http://downloadintel.com/embedded/processor/whitepaper/325293.pdf).

International Preliminary Report on Patentability dated Jun. 5, 2014 issued in PCT/US2011/061738 (2 pages).

Written Opinion of International Searching Authority dated Jul. 31, 2012 issued in PCT/US2011/061738 (5 pages).

Office Action dated Jun. 27, 2014 by the European Patent Office in application No. 11876149.3-1959 (3 pages).

EP Search report in corresponding application EP 11876149 dated May 28, 2015 (6 pages).

China State Intellectual Property Office, office action in corresponding CN application No. 201180074955.6 dated Dec. 2, 2016 (10 pages) [no English translation].

European Patent Office issued supplemental search report in corresponding divisional application No. EP16153494 dated Mar. 4, 2016 (7 pages).

China State Intellectual Property Office 1st office action in corresponding CN application No. 201180074955.6 dated Oct. 19, 2015 (10 page) [no English translation].

China State Intellectual Property Office 2nd office action in corresponding CN application No. 201180074955.6 dated Jun. 2, 2016 (11 pages) [no English translation].

EP office action in corresponding EP application No. 11876149.3 dated Jun. 8, 2015.

EP office action in corresponding EP application No. 16153494.6 dated Mar. 14, 2016.

U.S. office action in corresponding U.S. Appl. No. 14/959,455 dated Mar. 11, 2016.

U.S. office action in corresponding U.S. Appl. No. 14/959,455 dated Jul. 28, 2016.

U.S. office action in corresponding U.S. Appl. No. 14/959,455 dated Nov. 16, 2016.

EP Office Action in corresponding EP 11 876 149.3 dated Nov. 7, 2017 (5 pages).

* cited by examiner

RECONFIGURABLE GRAPHICS PROCESSOR FOR PERFORMANCE IMPROVEMENT

BACKGROUND

This relates generally to graphics processing in computer systems.

Graphics processors run under different processing conditions. In some cases, they can run in higher power consumption modes and in lower power consumption modes. It would be desirable to obtain the maximum performance possible, given the power consumption mode that the graphics processor operates within.

DETAILED DESCRIPTION

In some embodiments, graphics processing cores automatically reconfigure themselves to increase or maximize performance in both higher and lower power envelopes by dynamically power gating portions of the graphics processing engine. As used herein, power gating includes activating or deactivating a core portion.

While an example will be provided using a tablet computer graphics processor, the same concepts apply to any graphics processor.

A graphics processing core typically includes a number of execution units that perform arithmetic, logic, and other operations. A number of samplers may be used for texture processing. A sampler and a number of execution units are a subslice. A number of subslices may be included in a particular graphics processing core, based on target performance and power budget. Subslices are combined to form a graphics processing slice. A graphics processing core may contain one or more slices. In a tablet graphics processing core, single slice and one, two, or three subslice designs are commonly used. Multiple slices are common in client graphics processors.

Figure 1:
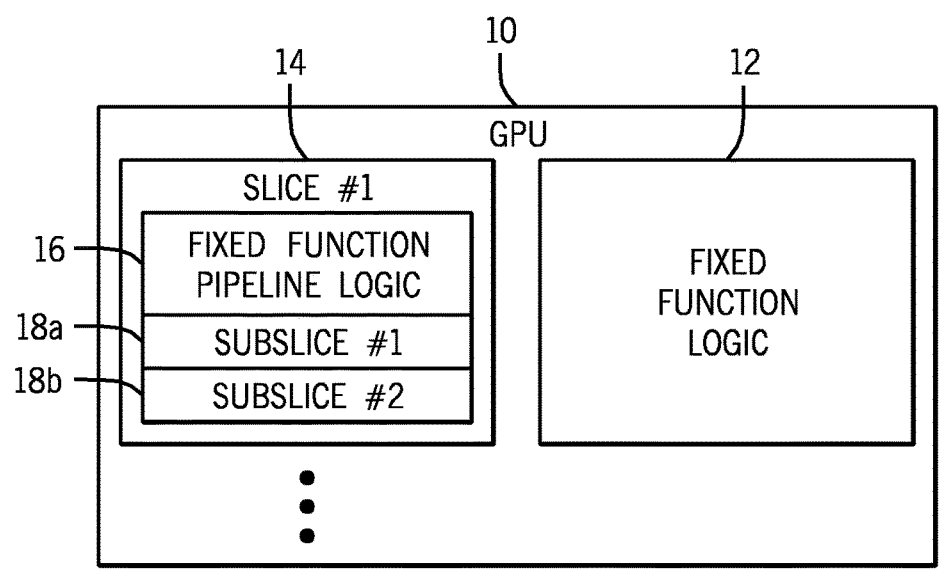
FIG. 1 is a block depiction of one embodiment of the present invention.

Thus, referring to FIG. 1, showing a typical graphics processor core, the core 10 includes a slice number 1, labeled 14, that may include a fixed function pipeline logic 16 and a number of subslices 18a and 18b. More slices and more or less subslices may be included in some embodiments. Also included in the graphics processor core is a fixed function logic 12.

Figure 4:
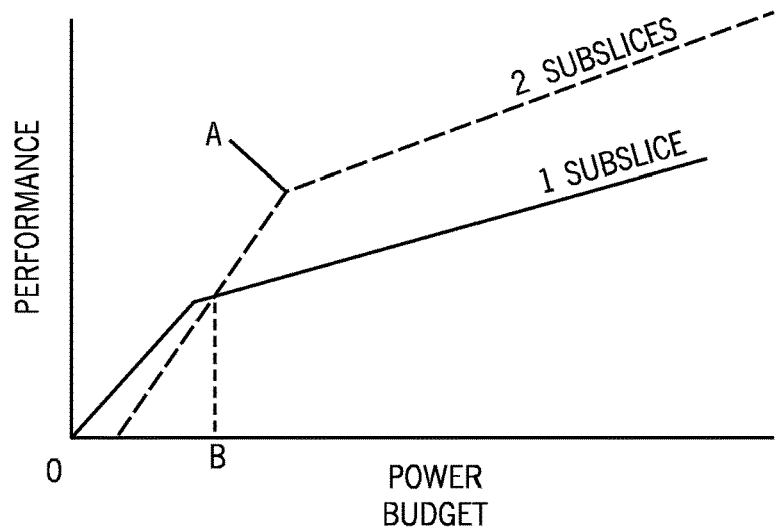
FIG. 4 is a hypothetical graph of performance versus power budget for one embodiment of the present invention.

The power and performance characteristics of one, two, and three subslice designs are different, as indicated in FIG. 4. Performance increases linearly up to a knee A (for example, around 2.5 Watts) of performance versus power dissipation, as one example. Below this knee, the graphics processor is operating in a frequency scaled region where graphics processor frequency can be raised without raising the operating voltage. Above the knee, graphics processor frequency is only raised if voltage is increased as well, which generally has a negative impact on power dissipation and results in a flatter plot of performance versus power dissipation than is experienced in the frequency scaled region.

One or more of the subslices of a graphics processor core may be power gated. Generally, the more subslices, the higher performance, but the performance gap reduces as the available power budget reduces and there may be a point B in FIG. 4 (for example, at around 1.5 Watts) wherein the single subslice configuration performs better than a two subslice configuration. This better performance is the result of the larger configuration having significantly more leakage power and, therefore, less room for dynamic power. In a lower power budget, less room for dynamic power can significantly limit the frequency and performance of the larger configuration, making it look less attractive than the smaller configuration.

In some embodiments, a power sharing mechanism may be used to achieve efficient dynamic power gating of graphics processor subslices. Of course, instead of gating subslice power consumption, the same concepts apply to dynamic power gating of any number of graphics processor slices in embodiments with more than one slice.

Figure 5:
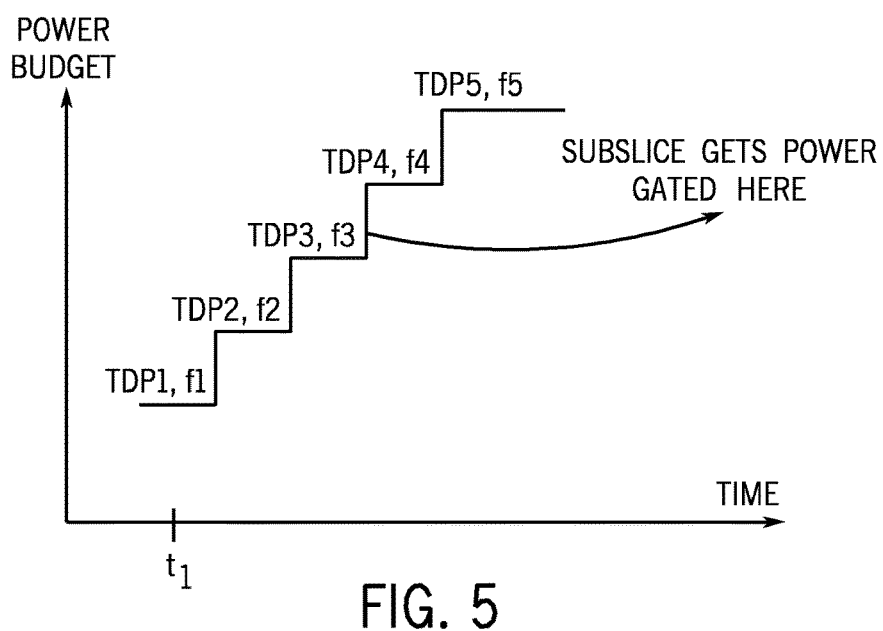
FIG. 5 is a hypothetical graph of power budget versus time for one embodiment.

Graphics processors may have a power sharing function that basically increases (or decreases) power over time, as shown in FIG. 5. At a particular point in time $t_1$, a graphics processor core may be assigned, by a power control unit, a power budget TDP1 at a particular lower level that forces the graphics processor to operate at a particular frequency f1 that is the maximum frequency that allows the graphics processor not to exceed its allocated power budget. As the power budget is increased over time, the graphics core may operate at progressively higher frequencies.

With subslice power gating, the power control unit knows ahead of time that the graphics processor core can be configured with a full complement of execution units and subslices or with less execution units and subslices. For example, one embodiment may include sixteen execution units and two subslices and another mode of operation may include eight execution units and one subslice. When the power budget available to the graphics processor is small, the graphics processor may be configured in the smaller core configuration with one of the two available subslices being power gated.

Generally, a subslice is not simply turned off at any particular point in time, as it may be executing active threads. When the power control unit makes the determination that a subslice should be power gated, the immediate action is to block new graphics processing threads from being scheduled on that subslice. Thus, it may take some time before the threads already executing on the subslice complete and the subslice becomes idle. Only then is the subslice actually power gated in one embodiment.

With power gating, as power budget is progressively increased, at some point a subslice that was initially turned off gets turned on. Or, reversely, as the processor progresses from higher to lower power budgets, a subslice may be turned off (as indicated in FIG. 5).

When a subslice is turned off, the frequency may increase or double (if one of two subslices is turned off). As a result, the performance can remain relatively stable, since the remaining subslice operates twice as fast as the two subslices. This frequency increase ensures a smooth (from a performance perspective) transition from the larger ungated graphics core to the smaller gated graphics core. Reversely, when a subslice is ungated and we transition to a two-subslice graphics core, the clock frequency reduces by half, to maintain overall performance at about the same level.

The clock frequency changes described above are designed to not significantly disrupt (e.g. double or half) the overall performance of the scalable portion of the graphics core, (subslice logic shown in FIG. 1) at the point in time when power gating occurs. However, if the act of power gating has produced a more power-efficient graphics core due to its lower leakage dissipation, this would subsequently allow the graphics core to raise its clock frequency and power dissipation to fill its allocated power budget. This would lead to increased performance, which was the ultimate goal of power gating.

On the other hand, when the power budget allocated to the graphics core increases and allows for adding a subslice, reducing the clock frequency by half will initially preserve the same performance. However, given the increased graphics power budget, the graphics core will be then allowed to also raise its frequency, which will bring the desired result of raising performance.

Raising or reducing clock frequency in the process of dynamic power gating as described above works well for the scalable portion of the graphics core, i.e. the subslice shown in FIG. 1. If, however, the same clock is used by the non-scalable portion of the graphics core (e.g. the fixed function logic 12, shown in FIG. 1) then changing the clock frequency may affect, and potentially limit, the performance of that logic. This would not be desirable. To avoid that, the non-scalable logic may use its own independent clock which is not affected by clock frequency changes in the scalable graphics logic.

Switching from a larger configuration to a smaller configuration can improve performance because it provides leakage savings and makes room for more dynamic power. At the same time, switching from the larger to the smaller configuration may potentially lead to increased dynamic power since the frequency increases correspondingly. Therefore, the transition from larger to smaller configuration may happen when the leakage savings achieved exceeds the dynamic power cost due to the corresponding frequency increase. When that condition holds, there will be a net power savings by the transition and there is room to increase the frequency even further and achieve a net performance gain.

Thus, to give an example, with a sixteen execution unit, two subslice unit transitioning to an eight execution unit, one subslice unit as a result of power gating, the following Leakage Delta (LD) equations apply:

$$LD > f_8 * C_8 * V_8^2 - f_{16} * C_{16} * V_{16}^2 \quad (1)$$

$$LD > f_8 * AR_8 * Cmax_8 * V_8^2 - f_{16} * V_{16}^2 \quad (2)$$

where f8 and f16 are the frequencies of the eight and sixteen execution unit configurations at the point in time when the power gating or ungating event occurs; V8 and V16 are the operating voltages of the two graphics processing cores when the power gating event occurs; C8 and C16 are the switching capacitance of the two graphics processing cores when the power gating event occurs; Cmax8 and Cmax16 and the maximum switching capacitance of the two graphics cores for a power virus workload; and AR16 and AR8 are the application ratios of the two cores right before and after the power gating or ungating event. The 'Application Ratio' of an application is defined as the ratio of the graphics core switching capacitance when that application executes on the core over the switching capacitance of the graphics core power virus.

These equations may be used to make the decision to initiate subslice power gating or not. The package power-sharing mechanism, which may already be supported by the graphics processor, involves knowledge of the leakage power as a function of operating conditions, including die, voltage, and temperature and that is usually fused into the part, so that this information is already available. From that information, the leakage delta of the power-gated graphics core can be dynamically calculated as well, by simply scaling total leakage by the number appropriate when a subslice is power gated.

If the graphics processing core is currently configured as a sixteen execution unit, two subslice core, f16 and V16 are its current frequency and voltage and the target frequency f8 to switch to, after power gating the subslice, is then two times f16. The matching voltage V8 is also known ahead of time. The current switching capacitance, C16, can be estimated using turbo energy counters already available in some graphics processing engines. The maximum capacitance Cmax8 is a static quantity that is also known ahead of time and fused into the part.

Thus, the only quantities in the above two equations that are not known and cannot be directly calculated using the existing power-sharing infrastructure is the target switching capacitance C8 and the target application ratio AR8 of the smaller configuration that we want to switch to. These two quantities are essentially equivalent since one can be calculated from the other (C8=AR8*Cmax8).

One way to estimate C8 or AR8 is a follows. Silicon measurements taken with different graphics workloads may show that the application ratio of a workload running on a larger graphics core is lower than the application ratio of the same workload running on a smaller graphics core by a relatively predictable scale factor, such as 0.8× or 0.7×, for a wide range of workloads. So, one approach is to do a post-silicon characterization of a range of applications running on the power gated or un-gated graphics cores. The average sixteen execution unit versus eight execution unit application ratio scale factor can then be calculated and may be programmed as a static application ratio scale factor. While active in sixteen execution units mode, the graphics core can dynamically estimate its current application ratio using the available turbo energy counters and then project its application ratio AR8 that it would have if it operated in eight execution units mode by using the scale factor described above.

Alternatively, energy monitor counters can be used to correlate (via a curve-fitting method) the values of the energy counters to not only the capacitance of the current sixteen execution unit graphics core ($C_{16}$) but also for the target sixteen execution unit graphics core that we will switch to after power gating occurs. Once that capacitance is estimated, equation (2) can be used to make the power gating decision. This method may be more accurate than the previous one, but may involve more detailed and time consuming post-silicon characterization of the energy monitor counters for both the 16 and 8 execution unit configurations.

Once the decision to power gate has been taken in the transition from sixteen to eight execution units has been completed, the power may be measured and, therefore, the switching capacitance or application ratio in the new eight execution unit configuration is also determined. If that turns out to be significantly higher than estimated, then the power gating decision that was taken was wrong. In such case, the decision can be reversed, transitioning back to the larger configuration. If, on the other hand, the capacitance estimation of the smaller configuration was done correctly before power gating, then the extra dynamic power measured after the transition to the smaller configuration is less than the power savings. In that case, the new configuration may be maintained and the power sharing mechanism naturally pushes to a somewhat higher frequency, resulting from the net power reduction at iso-performance, providing a performance gain. Of course, the same considerations can be used to handle power gating of multiple subslices or slices.

In the case of deactivating a core portion, we may be transitioning from an eight execution unit graphics core to a sixteen execution unit graphics core in some cases. We can use equations (1) and (2) to ensure that the extra leakage of the sixteen execution unit graphics core will be lower than the dynamic power savings achieved by reducing the clock frequency by half. In that case, clock frequency can be raised which will increase performance.

Figure 2:
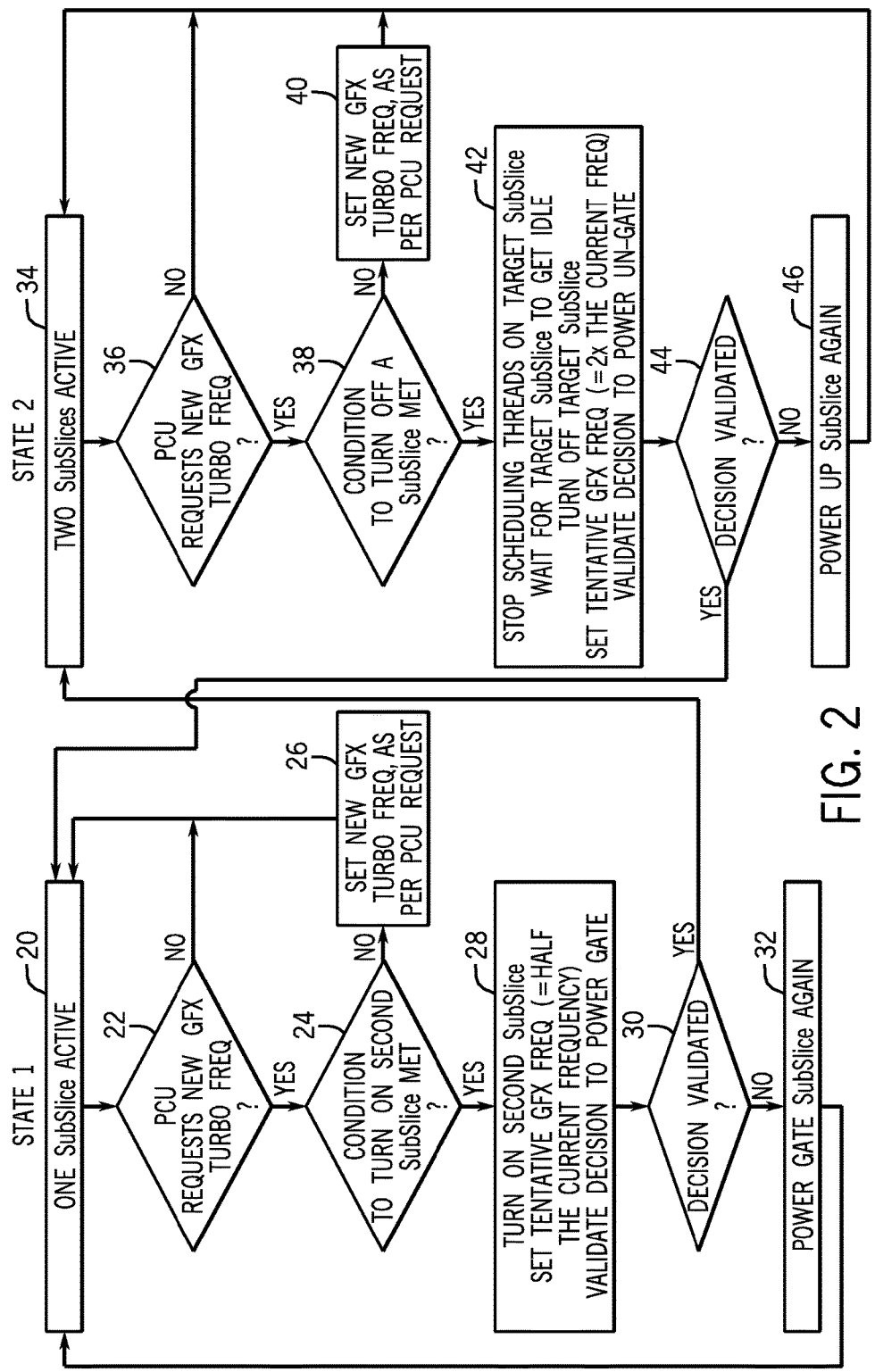
FIG. 2 is a flow chart for another embodiment of the present invention.

FIG. 2 shows a sequence for making the power gating determining in accordance with some embodiments of the present invention. The sequence may be implemented in hardware, software, and/or firmware. In software and firmware embodiments, it may be implemented in computer executed instructions stored in a non-transitory computer readable medium, such as a magnetic, optical, or semiconductor storage.

In state 1 in this example, one subslice is active, as indicated at block 20. A check at diamond 22 determines whether the power control unit requests a new graphics processor turbo frequency. If so, a check at diamond 24 determines whether the conditions to turn on a second subslice are met. If not, the new graphics turbo frequency is set (block 26), as requested by the power control unit. If so, the second subslice is turned on. A tentative graphics processor frequency is set (block 28) and the decision to power gate is then validated. If the validation is successful, as determined in diamond 30, the flow goes to state 2. If not, the subslice is power gated again, as indicated in block 32, and the processor returns to state 1.

In state 2, with two subslices active, as indicated at block 34, a check at diamond 36 determines whether the power control unit has requested a new graphics processor turbo frequency. If so, a check at diamond 38 determines whether the conditions to turn off a subslice have been met. If not, the new graphics processor turbo frequency is set (block 40) as requested. Otherwise, at block 42, thread scheduling on the target subslices is terminated. The sequence waits for the target subslice to become idle and, then when it does so, turns off the target subslice. A tentative graphics frequency is set and then the decision to power ungate is validated. If the decision is validated at diamond 44, the flow proceeds back to state 1. Otherwise, the subslice is powered up again, as indicated in block 46.

Figure 3:
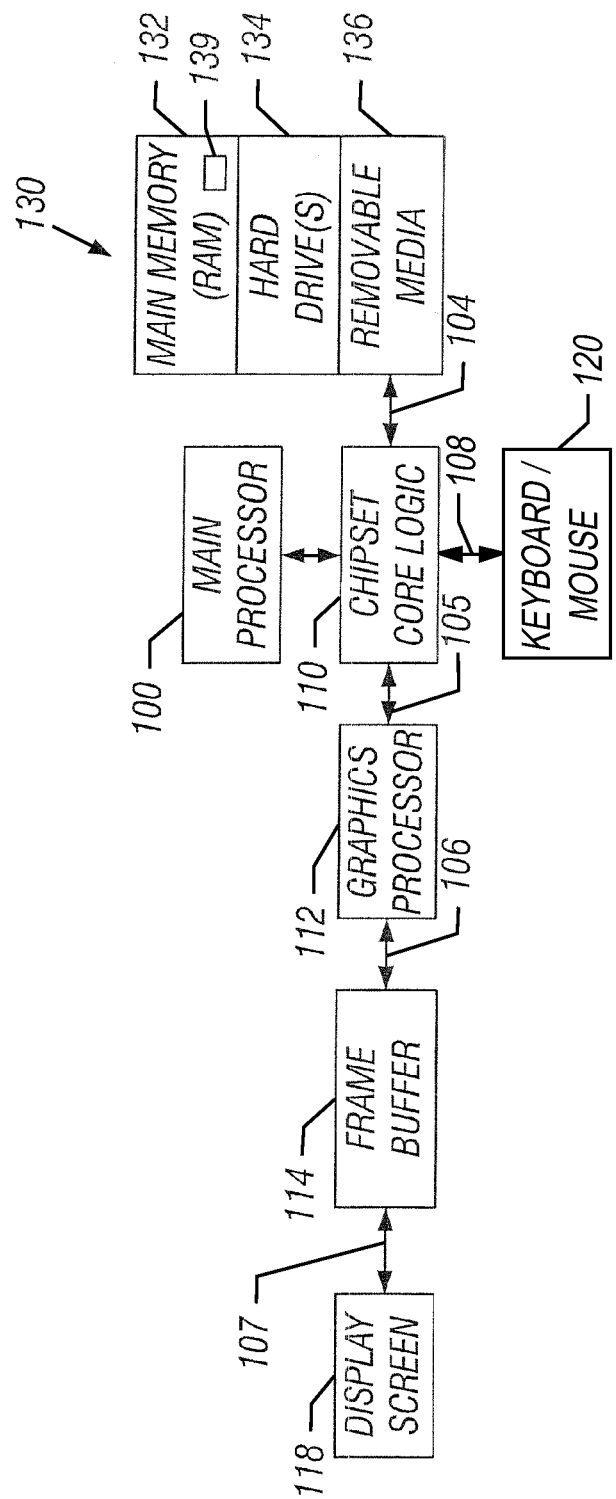
FIG. 3 is a schematic depiction of one embodiment of the present invention.

The computer system 130, shown in FIG. 3, may include a hard drive 134 and a removable medium 136, coupled by a bus 104 to a chipset core logic 110. The computer system may be any computer system, including a smart mobile device, such as a smart phone, tablet, or a mobile Internet device. A keyboard and mouse 120, or other conventional components, may be coupled to the chipset core logic via bus 108. The core logic may couple to the graphics processor 112, via a bus 105, and the central processor 100 in one embodiment. The graphics processor 112 may also be coupled by a bus 106 to a frame buffer 114. The frame buffer 114 may be coupled by a bus 107 to a display screen 118. In one embodiment, a graphics processor 112 may be a multi-threaded, multi-core parallel processor using single instruction multiple data (SIMD) architecture.

In the case of a software implementation, the pertinent code may be stored in any suitable semiconductor, magnetic, or optical memory, including the main memory 132 (as indicated at 139) or any available memory within the graphics processor. Thus, in one embodiment, the code to perform the sequence of FIG. 2 may be stored in a non-transitory machine or computer readable medium, such as the memory 132, and/or the graphics processor 112, and/or the central processor 100 and may be executed by the processor 100 and/or the graphics processor 112 in one embodiment.

The graphics processing techniques described herein may be implemented in various hardware architectures. For example, graphics functionality may be integrated within a chipset. Alternatively, a discrete graphics processor may be used. As still another embodiment, the graphics functions may be implemented by a general purpose processor, including a multicore processor.

References throughout this specification to "one embodiment" or "an embodiment" mean that a particular feature, structure, or characteristic described in connection with the embodiment is included in at least one implementation encompassed within the present invention. Thus, appearances of the phrase "one embodiment" or "in an embodiment" are not necessarily referring to the same embodiment. Furthermore, the particular features, structures, or characteristics may be instituted in other suitable forms other than the particular embodiment illustrated and all such forms may be encompassed within the claims of the present application.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:
1. A method comprising:
   determining a performance measure of a graphics processor in a larger configuration without power gating;
   power gating one of two hardware portions of a graphics processor;
   determining performance of the graphics processor with power gating;
   determining in the graphics processor if the graphics processor performance was improved by power gating compared to graphics processor performance without power gating to determine the effect of graphics processor power gating by comparing performance of the graphics processor with and without any power gating; and
   transitioning to a smaller configuration, with power gating, only if leakage savings of the smaller configuration exceed dynamic power cost due to increased frequency operation in the smaller configuration.
2. The method of claim 1 including power gating a slice.
3. The method of claim 1 including power gating a subslice.
4. The method of claim 1 including changing operating frequency after power gating.
5. The method of claim 1 including power gating the portion off only after all pending tasks on the portion have completed.
6. The method of claim 1 including power gating for power budgeting.
7. The method of claim 1 including checking power budget after power gating.

8. The method of claim 1 including determining target switching capacitance and target application ratio.

9. The method of claim 8 including using one of silicon measurements or energy monitor counters.

10. A non-transitory computer readable medium storing instructions for execution by a computer to:
    determining a performance measure of a graphics processor in a larger configuration without power gating;
    power gating one of two hardware portions of a graphics processor;
    determining performance of the graphics processor with power gating;
    determining in the graphics processor if the graphics processor performance was improved by power gating compared to graphics processor performance without power gating to determine the effect of graphics processor power gating by comparing performance of the graphics processor with and without any power gating; and
    transitioning to a smaller configuration, with power gating, only if leakage savings of the smaller configuration exceed dynamic power cost due to increased frequency operation in the smaller configuration.

11. The medium of claim 10 further storing instructions to power gate a slice.

12. The medium of claim 10 further storing instructions to power gate a subslice.

13. The medium of claim 10 further storing instructions to change operating frequency after power gating.

14. The medium of claim 10 further storing instructions to power gate the portion off only after all pending tasks on the portion have completed.

15. The medium of claim 10 further storing instructions to power gate for power budgeting.

16. The medium of claim 10 further storing instructions to check power budget after power gating.

17. The medium of claim 10 further storing instructions to determine target switching capacitance and target application ratio.

18. The medium of claim 17 further storing instructions to use one of silicon measurements or energy monitor counters.

19. A graphics processor comprising:
    first and second independently gateable hardware portions of the graphics processor; and
    logic to power gate one of two portions of a graphics processor and to determine a performance measure of a graphics processor in a larger configuration without power gating, determine performance of the graphics processor with power gating, determine if the graphics processor performance was improved by power gating compared to performance without power gating to determine the effect of graphics processor power gating by comparing performance of the graphics processor with and without any power gating and transition to a smaller configuration, with power gating, only if leakage savings of the smaller configuration exceed dynamic power cost due to increased frequency operation in the smaller configuration.

20. The graphics processor of claim 19, said logic to power gate a slice.

21. The graphics processor of claim 19, said logic to power gate a subslice.

22. The graphics processor of claim 19, said logic to change operating frequency after power gating.

23. The graphics processor of claim 19, said logic to power gate the portion off only after all pending tasks on the portion have completed.

24. The graphics processor of claim 19, said logic to power gate for power budgeting.

25. The graphics processor of claim 19, said logic to check power budget after power gating.

26. The graphics processor of claim 19, said logic to determine target switching capacitance and target application ratio.

27. The graphics processor of claim 26, said logic to use one of silicon measurements or energy monitor counters.

* * * * *